United States Patent [19]

Saunders et al.

[11] 3,904,583

[45] Sept. 9, 1975

[54] PREPARATION OF ORGANOSILICON POLYMERS

[75] Inventors: John Allen Saunders, Reigate; Barrie Searle Cox, Teddington, both of England

[73] Assignee: National Research Development Corporation, London, England

[22] Filed: Apr. 26, 1974

[21] Appl. No.: 464,338

Related U.S. Application Data

[63] Continuation of Ser. No. 333,538, Feb. 20, 1973, abandoned.

[52] U.S. Cl. ............ 260/46.5 R; 260/2 S; 423/326
[51] Int. Cl.² .......................................... C08G 77/06
[58] Field of Search ......... 260/46.5 R, 2 S; 423/326

[56] References Cited
UNITED STATES PATENTS

3,661,846  5/1972  Kenney ......................... 260/46.5 R
3,692,816  9/1972  Della Faille et al. ............ 260/46.5 R

OTHER PUBLICATIONS

Lenz, Inorganic Chemistry, Vol. 3, No. 4, April 1964, pp. 574–579.
Frazier et al., Inorganic Chemistry, Vol. 6, No. 9, Sept. 1967, pp. 1693–1696.
Linsky et al., Journal of Polymer Science, Part A-Z, Vol. 9, pp. 143–160 (1971).
Hurlbut, Jr., Mineralogy, 17th Ed., 1959, pp. 394, 398, 415, 423, 435, 459, 463 and 475.

*Primary Examiner*—Melvyn I. Marquis
*Attorney, Agent, or Firm*—Finnegan, Henderson, Farabow & Garrett

[57] ABSTRACT

An organic solvent soluble organosilicon polymer is produced by reacting a polysilicate mineral with an organosilyl capping agent in the presence of an acid, a water miscible organic solvent and water, so that silylation of the polysilicate takes place with at least partial retention of the silicate backbone.

24 Claims, No Drawings

PREPARATION OF ORGANOSILICON POLYMERS

This is a continuation of application Ser. No. 333,538, filed Feb. 20, 1973, and now abandoned.

This invention relates to the preparation of organosilicon polymers.

Such polymers have a number of uses as rubbers, plastics, lubricants, resins and surface coatings. They are, however, expensive since they are generally made by total synthesis involving multiple steps. Their uses are therefore generally limited to specialised applications.

It is an aim of the present invention to provide a less expensive process for the preparation of such organosilicon polymers.

It has been proposed to prepare trimethylsilyl derivatives of certain silicate minerals by reaction with hexamethyldisiloxane in the presence of concentrated hydrochloric acid and isopropanol.

Using the above process organic solvent soluble trimethylsilyl derivatives of silicate minerals such as olivine, hemimorphite, sodalite, natrolite and laumonite may be prepared, and the same technique has also been used to study the distribution of silicate structures in aqueous solutions of sodium silicates and also in Portland Cement. However, the above process has been found to be much less effective when attempts have been made to produce an organic solvent soluble organosilicon polymer from a polysilicate mineral. For example, the yield of organic solvent soluble polymer obtained by applying the process to wollastonite has been reported as being less than 3 percent.

The present invention provides a process in which greatly improved yields can be obtained from polysilicate minerals such as wollastonite.

According to the present invention there is provided a process for the production of an organic solvent soluble organosilicon polymer which comprises reacting a polysilicate mineral with an organosilyl capping agent in the presence of an acid in an amount sufficient to react with at least half the metal cations of the polysilicate mineral, a water miscible organic solvent and water in an amount such that the concentration of the acid in the aqueous phase is not greater than two gram equivalents per litre, so that silylation of the polysilicate takes place with at least partial retention of the silicate backbone.

The polysilicate mineral may be a naturally occurring or synthetic polysilicate, and may, for example, be a silicate of magnesium, calcium, zinc, manganese, lead, copper, or iron (II). Also included are polysilicates of two or more of such metals in combination, and polysilicates in which such metals occur in combination with an alkali metal such as for example, lithium, sodium or potassium. Particularly suitable polysilicates include minerals from the groups of metasilicates, pyroxenes and amphiboles, certain sheet silicates and certain framework silicates, for example zeolites. Specific examples of suitable minerals include wollastonite, johannsenite, hectorite, chrysotile, and sepiolite. Examples of synthetic polysilicates which may be used in the process of the invention are the acid-leachable glasses. Lists of polysilicate minerals containing metal cations which can react with acids are set out in American Mineralogist 28, 545 (1943) and Bull. Chem. Soc. Japan 34, 214 (1961).

These polysilicates contain a polymeric siloxane chain or backbone with a well defined stereo chemical configuration in a chain, ladder, sheet or three dimensional polymeric form. The process of the invention, therefore, avoids the normally expensive and involved steps of synthesising this polymeric siloxane chain.

The polysilicates contain metal cations and, during the course of reaction under acidic conditions, these metal cations may be removed and the resulting polysilicic acid (or polysiloxane with silanol pendant groups) may be reacted with organic capping groups to give the desired organic solvent soluble polymer. Although the invention is not restricted to any particular theory it is believed that unless the rate of cation removal is controlled by operating within the specified reaction conditions siloxane crosslinking of the silanol groups of the polysilicic acid intermediate proceeds much more rapidly than the capping reaction resulting almost entirely in the formation of undesirable organic solvent insoluble polymeric material.

The particle size of the polysilicate mineral has an effect on the yield of organic solvent soluble organosilicon polymer, and for good results the particle size should be as small as possible. For example, very good results have been obtained using a polysilicate mineral having an average particle size of less than 4 microns.

The acidic conditions under which the reaction takes place may be provided by reacting the polysilicate mineral and capping agent in the presence of a water soluble acid, particularly a mineral acid, for example hydrochloric, sulphuric, or nitric acid, a sulphonic acid, for example sulphamic acid, or a mixture of one or more of the above acids and an organic acid for example p-toluene sulphonic acid, halogenated organic acids, for example chloracetic acid, fatty acids, for example acetic acid, or in the presence of a cation exchange resin in its acid-regenerated form. Organic acids used alone have been found to be ineffective, but good results have been obtained using mixtures of organic and inorganic acids containing up to about 97 percent by weight of the organic acid. The acid concentration in the reaction medium is critical since it is believed to be necessary to arrange that the rate of removal of metal cations from the polysilicate mineral and the rate of reaction of the silanol groups so produced with the organic capping agent are roughly comparable. In general it is desirable to use from 0.5 to 3.0 equivalents of acid based on the metal cation content of the polysilicate, and preferably from 0.8 to 2.0 equivalents of acid. Excellent results have been obtained using hydrochloric, nitric and sulphamic acids and these are the preferred acids for the process of the invention. The concentration of acid in the aqueous phase of the reaction medium (measured on a volumetric basis including the volume of both the water and the water miscible organic solvent) should preferably be between 0.5 and 1.0 gram equivalents per litre.

Suitable organosilyl capping agents include organodisiloxanes, for example $(CH_3)_3SiOSi(CH_3)_3$, organosilanols and their esters with inorganic or organic acids, for example $Me_3SiOSO_3H$ (sulphate) or $Me_3SiOCOCH_3$ (acetate), alkoxy or aryloxy silanes, for example $ROSiMe_3$ or halogenosilanes, for example $Me_3SiCl$. Polymers capped with vinyl dimethylsilyl groups (for example $CH_2=CH(Me)_2Si-$), phenyldimethylsilyl groups $(Ph(Me)_2Si-)$, diphenylmethylsilyl groups $(Me(Ph)_2Si-)$ and hydroxymethyldimethylsilyl groups (HOCH$_2$ (Me)$_2$ Si—) may be prepared using their corresponding ethoxy or halogeno derivatives as capping agents. A particular advantage of using halogeno derivatives as capping agents is that in certain cases they can act both as the silylating capping agent and the acid. For example addition of trimethylchlorosilane to the reaction medium results in the formation of trimethylsilanol and hydrochloric acid by reaction with the water in the reaction medium.

The aqueous phase of the reaction medium comprises a mixture of water and a water-miscible organic solvent. It is believed that the presence of the water miscible organic solvent increases the solubility of the organosilyl capping agent in the aqueous phase. Particularly preferred water miscible organic solvents are isopropanol, and diethylene glycol monoethyl ether but other organic solvents such as for example acetone, ethylene glycol monomethyl ether, acetic acid, and methylethylketone may also be used. Some reduction in the yield of polymer may result from the use of acetic acid. Preferably the ratio by volume of the water miscible organic solvent to water is within the range of from 3:1 to 1:3.

The yield of soluble organosilicon polymer may often be improved by the addition of a wetting agent to the reaction medium. It does not appear that the type of wetting agent, i.e. anionic nonionic or cationic is critical. An example of a suitable wetting agent is Lissapol C paste, an aqueous paste containing 30 percent of the sodium salt of a sulphated cetyl/oleyl alcohol mixture. From about 0.1 to 3.0 percent by weight of the wetting agent based on the weight of the reaction mixture is usually found to be a suitable quantity.

It has been found that the yield of soluble organosilicon polymer can also be improved by comminuting the polysilicate mineral during the reaction. Indeed by comminuting the polysilicate mineral during the reaction it is possible to perform the process of the invention using a wide range of acid concentrations extending outside the limits previously specified. Thus, in another aspect, the invention provides a process for the production of an organic solvent soluble organosilicon polymer which comprises reacting a polysilicate mineral with an organosilyl capping agent in the presence of an acid in an amount sufficient to react with at least half the metal cations of the polysilicate mineral, a water miscible organic solvent and water, and comminuting the polysilicate mineral during reaction, so that silylation of the polysilicate takes place with at least partial retention of the silicate backbone.

Comminution of the polysilicate mineral is preferably carried out by ball milling the polysilicate mineral in the presence of the other reactants. Ball milling may be carried out using ceramic balls or, preferably, glass ballotini. The reaction conditions are as previously specified except that higher concentrations of acid can be tolerated in the reaction medium without adversely affecting the yield of organic solvent soluble organosilicon polymer.

In general it is found that no improvement is obtained by conducting the reaction at elevated temperatures and reaction temperatures of ambient or below are preferred.

The organic solvent soluble polymers of the invention are soluble in a wide variety of organic solvents, for example white spirit, acetone and carbon tetrachloride and are valuable as film forming materials. They are stable to hydrolysis and to heat up to about 200°C but can be cured to give clear films on stoving. The films may also be cured by the addition of suitable catalysts, for example the addition of a combination of lead naphthenate and butyltitanate to a solution of the polymer in an organic solvent before formation of the film allows the film to be cured at room temperature. Vinyl dimethylsilyl capped polymers may also be cured by the addition of a free radical donating agent which induces cross-linking between adjacent pendant groups. A suitable cross-linking agent is tertiary butyl perbenzoate which may be added to a solution of the polymer in an amount of from about 1 to 5 percent by weight. The polymers are also useful as paint additives, and in particular the addition of a very small quantity, for example from about 100 parts per million to 0.1 percent by weight to alkyd, epoxy ester, and other paints, acts as a gloss improver. The flow properties of the paints are also improved. Films of the polymer may also be used for rendering glass hydrophobic, for example for windscreens.

There is frequently some production of cross-linked organic solvent insoluble polymeric material during the reaction and this material is typically a hydrophobic organophilic powder which is readily compatible with organo solvents for example aliphatic hydrocarbon solvents, and organic polymers. Therefore, this material has uses as a water repellent, reinforcing filler and extender for plastics material, rubber compounds and paints.

The invention will now be illustrated by the following Examples:

EXAMPLE I

A reaction medium is prepared by dissolving sulphamic acid (44 g) in a mixture of water (275 ml) and isopropanol (275 ml), adding hexamethyldisiloxane (42 g) and stirring at room temperature for one hour. Dry powdered wollastonite (15.19 g) is then added while stirring vigorously, and stirring is continued for 48 hours.

The product consists of a mixture of two liquids and a solid particulate phase. The solid is filtered off and washed first with a mixture of equal parts of water and isopropanol, then with normal hexane, the washings being added to the filtrate. The filter cake after drying at 100°C weighs 9.48 g with a carbon content of 9.76 percent. The filtrate plus washings separates into aqueous and non-aqueous phases. The aqueous layer is discarded and the non-aqueous fraction dried over anhydrous sodium sulphate and distilled at low pressure (0.1 mm Hg) to remove hexane and hexamethyldisiloxane. The residue in the distillation flask consists of 2.47 grams of pale yellow resinous polymer. Its carbon content found by combustion analysis is 26.5 percent, its infra-red (I.R.) and nuclear magnetic resonance (N.M.R.) spectra show the presence of both hydroxyl and trimethylsilyl groups. Analysis by gel permeation chromatography (G.P.C.) gives a number average molecular weight of 2,570 and a weight average molecular weight of 6,000 with 10 percent of the product having a polymer chain length in excess of 250 A.

EXAMPLE II

To the reaction medium as described in Example I is added 15.19 g of dry powdered wollastonite, together with 2.4 grams of Lissapol C paste. The reaction is then continued as in Example I and the products are isolated as in that Example.

The filter cake solids from this reaction weighs 9.89 grams and contains 11.6 percent of carbon.

After distillation of the non-aqueous filtrate, 2.78 grams of a pale yellow polymer is obtained, with a carbon content of 29.8 percent.

Instrumental analysis as in Example I shows the presence of hydroxyl and trimethylsilyl groups from its I.R. and N.M.R. spectra. G.P.C. analysis gives a number average molecular weight of 3,200 and a weight average of 7,740 with 14 percent of the product having a chain length in excess of 250 A.

As can be seen, in the presence of the surface active agent, there is an increased yield of pale yellow polymer.

EXAMPLE III

The reaction medium as prepared in Example I is mixed with 15.19 g of dry powdered wollastonite and 2.4 g of Lissapol C paste in a ½ gallon capacity ball mill pot containing ceramic balls and milled for 48 hours. The mineral is thus comminuted continuously for 48 hours in the reaction medium. The products are isolated as in Example I.

The weight of filter cake solids is 10.3 grams with a carbon content of 7.73 percent.

The yield of pale yellow polymer is 3.17 g. It has a carbon content of 30.6 percent a number average molecular weight of 3,300 and a weight average of 7,820. The proportion of polymer with a chain length in excess of 250 A was 15 percent.

EXAMPLE IV

A reaction medium is prepared by dissolving 26 ml of concentrated hydrochloric acid (36.5% HCl by weight) in a mixture of water (260 ml) and isopropanol (277 ml) adding hexamethyldisiloxane (42 g) and stirring at room temperature for one hour. Dry powdered wollastonite (15.0 g) is then added and the reaction allowed to continue with vigorous stirring for 48 hours.

The method of isolating the products by filtration, washing and separation of the filtrates into aqueous and non-aqueous parts is identical with the procedure set out in Example I.

Upon distillation of the non-aqueous part of the filtrate, a yield of 4.15 grams of pale yellow solid polymer is obtained. Its carbon content found by combustion analysis is 26.9 percent. I.R. and G.P.C. analysis indicates that the resin contains hydroxyl and trimethylsiloxy side groups with 12 percent of the polymer having a chain length in excess of 250 A. The number average and weight average molecular weights are 2,590 and 6,970 respectively.

The pale yellow polymer of the above Examples are all found to be soluble in a wide range of common organic solvents, (e.g. white spirit, acetone, carbon tetrachloride). Furthermore, the polymers are stable to hydrolysis and to heat up to 200°C and can be cured to clear films on stoving.

EXAMPLE V

A reaction medium as in Example IV is mixed with 15.0 g of dry wollastonite in a half gallon capacity ball mill pot containing ceramic balls and milled on a planetary ball mill for three hours. Products are isolated as in Example I. The yield of soluble pale yellow solid polymer is increased to 5.91 gms. Instrumental analysis showed that the product is typical for a trimethylsilyl capped polymer.

EXAMPLE VI

To a cooled reaction medium containing water (300 ml) and isopropanol (275 ml) trimethylchlorosilane (50 ml) is added dropwise and allowed to equilibrate for 1 hour. The trimethylchlorosilane acts both as acid leaching and capping agent, liberating 0.72 gram equivalents of HCl per litre. Wollastonite (15 g) is then added and the reaction product isolated as described in Example I.

The yield of pale yellow solvent soluble resin is 4.00 g. Characterisation shows it to be essentially bis (trimethylsilyl) polysiloxane.

EXAMPLE VII

To a vigorously stirred reaction medium of isopropanol (275 ml), water (260 ml) conc. HCL (36.5 ml) and vinyldimethylethoxysilane (50.4 g), 15 gms. of dry powdered wollastonite are added and the reaction allowed to continue with stirring for 48 hours. Products are then isolated as described in Example I.

The yield of pale yellow viscous resin is 4.00 g and is similar in appearance and solubility to the trimethylsilyl capped polymers. Infra-red analysis confirmed the presence of hydroxl and vinyldimethysilyl groups.

EXAMPLE VIII

The reaction as described in Example VI is carried out using diphenyl-methylchlorosilane (80 ml) as the capping agent. On isolating the polymer a yield of 3.7 g is obtained of a dark brown solid resin, soluble in ketonic and aromatic type solvents. I.R. analysis shows the presence of diphenyl methylsilyl groups.

EXAMPLE IX

Wollastonite (15 g) is added to the reaction medium described below and the products isolated as described in Example I. The reaction medium is isopropanol (275 ml), water (260 ml) conc HCl (36.5 ml), trimethylethoxy-silane (36.72 g), vinyldimethylethoxysilane (10.09 g) and n-hexane (200 ml). I.R. analysis indicates that the resin contains hydroxyl, trimethylsilyl and vinyldimethylsilyl side groups. The yield of the pale yellow solid resin is 3.9 g.

EXAMPLE X

Isopropanol (275 ml), water (260 ml) conc. HCl (36.5 ml) and hexamethyldisiloxane (42 g) are equilibrated for one hour with 1,500 cm$^3$ of 3 mm diameter glass ballotini balls contained in a clean Winchester quart bottle. To this equilibrated reaction medium Wollastonite (15 g) is added and the bottle and contents subjected to 116 hours of vigorous agitation on a bottle shaker. The soluble resinous product is isolated as described in Example I although care has to be taken in separating and cleaning the ballotini balls.

The yield of colourless, opaque, solid resin is 14.00 gms. I.R. analysis shows the presence of hydroxyl and trimethylsilyl groups. G.P.C. analysis gives a number average molecular weight of 2,170 and a weight average of 4,060.

EXAMPLE XI

Isopropanol (275 ml), water (235 ml), conc. HCl (99 ml), hexamethyldisiloxane (42 g) and n-hexane (200 ml) are equilibrated for one hour with 1,500 cm$^3$ of 1.0–1.5. mm ballotini in a Winchester quart bottle. To this equilibrated reaction medium hexagonite (15 g) is added and vigorously agitated for 65 hours.

The soluble resinous product is isolated in the usual manner and is a white, opaque polymer of yield 20.5 gms.

Using Johannsenite (a pyroxene) or Sepiolite as the mineral source in an identical reaction to that described above, 13.4 g and 23.7 g of resin are isolated from 15 g of mineral respectively. The Johannsenite polymer product is a white, opaque, solid material whilst the Sepiolite product is a light pink solid. G.P.C. analysis of the soluble products gives the following results:

|  | Mw | Mn |
| --- | --- | --- |
| Johannsenite | 2270 | 1870 |
| Hexagonite | 2450 | 1650 |
| Sepiolite | 3400 | 1900 |

EXAMPLE XII

A reaction medium, as prepared in Example IV is added to a Winchester quart bottle containing 1,500 cm$^3$ of new 1 to 1.5 mm diamater glass ballotini and h-hexane (200 ml). No further addition is made and the mixture is vigorously agitated on a bottle shaker for 116 hours.

A pale yellow flowable polymer in 5.14 g yield is isolated from the non-aqueous phase. Instrumental analysis indicates the presence of hydroxyl, trimethylsilyl and siloxane groups. The polymer shows similar stablity and solubility to the trimethylsilyl capped polymers isolated from wollastonite, but its G.P.C. trace reveals only low molecular weight species present, the weight average being 2,220 and number average 1,760.

EXAMPLE XIII

A reaction mixture is made up as described in Example IV but using diethyleneglycol monoethyl ether (275 ml) as the water miscible co-solvent instead of isopropanol. The reaction time is 48 hours.

The products of reaction are separated and worked up as described in Example IV, and a yield of 3.7 grams of organic-solvent soluble resin is obtained. This resin has a number average molecular weight of 3,000 and a weight average molecular weight of 9,100 as measured by G.P.C., with 18 percent of the product having a chain length in excess of 250 A.

EXAMPLE XIV

A reaction medium is prepared by dissolving trichloroacetic acid (42.0 g) in a mixture of concentrated hydrochloric acid (11.0 ml), water (275 ml) and acetone (275 ml). Hexamethyldisiloxane (42 g) is added and the mixture is stirred for one hour before the addition of powdered wollastonite (15 g). Stirring is continued for a further 18 hours, and the reaction products are then filtered and separated as in Example I. The yield of resin isolated from the non-aqueous liquid phase is 3.3 g. It is found by G.P.C. to have a number average molecular weight of 3,000 and a weight average molecular weight of 9,000, with 17 percent of the polymer having a chain length in excess of 250 A.

EXAMPLE XV

A reaction mixture is prepared as in Example IV but using concentrated nitric acid (19 ml) as the leaching acid. This is equal to 1.15 equivalents of acid referred to the calcium content of the mineral used. After stirring for one hour, 15 g of powdered wollastonite is added and the stirring continued for 48 hours. After filtration and separation as described in Example I, the non-aqueous liquid phase of the reaction mixture was worked up to a yield of 3.3 g of a solvent-soluble resin. The number average molecular weight is 3,400 and the weight average molecular weight is 6,300.

EXAMPLE XVI

Wollastonite powder is reduced to a finer particle size as follows:

A mixture of 600 ml water and 112 g wollastonite powder (average particle size 4.1 microns) are added to a half gallon capacity ball mill pot containing ceramic balls and milled for 2 hours on a planetary ball mill. The solids are filtered, dried and weighed and found to be contaminated with Steatite (30 percent) due to wear of the ceramic balls. The product is used in a silylation reaction as follows:

To the reaction medium as prepared in Example IV 19.6 gms of the prior ground wollastonite are added. The reaction is then continued as in Example IV and the products isolated in the normal manner. 5.61 g of solvent soluble colourless, solid resin are obtained and identified by the methods described in the original specification. It is found to be typical for a trimethylsilyl capped polymer with a weight average molecular weight of 11,630 a number average of 2,880 and a 12% polymer portion in excess of 250 A.

EXAMPLE XVII

A reaction medium as prepared in Example IV of the original application is added to a Winchester quart bottle containing 1,300 cms$^3$ of 1.0–1.5 mm diameter glass ballotini. Dry prior ground wollastonite (19.6 g) as prepared in Example XVI is then added and the mixture vigorously agitated on a bottle shaker for 48 hours.

The yield of pale yellow solid resin isolated from this reaction is 15.7 g.

EXAMPLE XVIII

A reaction mixture is prepared by dissolving sulphosalicylic acid (70 g) in a mixture of concentrated hydrochloric acid (4.4 ml), isopropanol (275 ml) and water (275 ml), adding hexamethyldisiloxane (42 g) and stirring at room temperature for one hour.

Dry powdered wollastonite (15 g) is added and the mixture stirred for 18 hours. The products of the reaction are filtered, and separated as described in Example I. The weight of resin isolated from the non-aqueous liquid phase is 4.7 g. Analysis by G.P.C. gives a number average molecular weight of 1,500 and a weight average molecular weight of 1,700.

We claim:

1. A process for the production of an organic solvent soluble organosilicon polymer which comprises reacting wollastonite with an organosilyl capping agent in the presence of an acid in an amount sufficient to react with at least half the replaceable metal cations of the wollastonite, a water miscible organic solvent and water in an amount such that the concentration of the acid in the aqueous phase is not greater than two gram equivalents per litre, so that silylation of the wollastonite takes place with at least partial retention of the silicate backbone.

2. A process according to claim 1, in which the acid is a mineral acid or a sulphonic acid.

3. A process according to claim 1, in which the acid comprises a mixture of an organic and inorganic acid containing up to 97% by weight of the organic acid.

4. A process according to claim 1, in which the acid is hydrochloric acid, nitric acid or sulphamic acid.

5. A process according to claim 1, in which there is used from 0.5 to 3.0 equivalents of acid based on the metal cation content of the polysilicate mineral.

6. A process according to claim 1, in which the concentration of acid in the aqueous phase of the reaction medium is from 0.5 to 1.0 gram equivalents per litre.

7. A process according to claim 1, in which the organosilyl capping agent is an organodisiloxane, an organosilanol or an ester thereof, an alkoxy or aryloxy silane, or a halogenosilane.

8. A process according to claim 1, in which the water miscible organic solvent is isopropanol or diethylene glycol monoethyl ether.

9. A process according to claim 1, in which a wetting agent is added to the reaction medium.

10. A process according to claim 1, in which the organosilicon polymer comprises vinyl groups which are subsequently cross-linked by the addition of a free radical donating agent.

11. A process for the production of an organic solvent soluble organosilicon polymer which comprises reacting a polysilicate mineral with an organosilyl capping agent in the presence of an acid in an amount sufficient to react with at least half the replaceable metal cations of the polysilicate mineral, a water miscible organic solvent and water, and comminuting the polysilicate mineral during reaction, so that silylation of the polysilicate takes place with at least partial retention of the silicate backbone.

12. A process according to claim 11, in which the polysilicate mineral is a metasilicate, a pyroxene or an amphibole.

13. A process according to claim 11, in which the polysilicate mineral is wollastonite.

14. A process according to claim 11, in which comminution of the polysilicate mineral is carried out by ball milling the polysilicate mineral in the presence of the organosilyl capping agent, acid, water miscible organic solvent, and water.

15. A process according to claim 14, in which the ball milling is carried out using glass ballotini.

16. A process according to claim 11, in which the acid is a mineral acid or a sulphonic acid.

17. A process according to claim 11, in which the acid comprises a mixture of an organic and inorganic acid containing up to 97 percent by weight of the organic acid.

18. A process according to claim 11, in which the acid is hydrochloric acid, nitric acid or sulphamic acid.

19. A process according to claim 11, in which the organosilyl capping agent is an organodisiloxane, an organosilanol or an ester thereof, an alkoxy or aryloxy silane, or a halogenosilane.

20. A process according to claim 11, in which the water miscible organic solvent is isopropanol or diethylene glycol monoethyl ether.

21. A process according to claim 11, in which a wetting agent is added to the reaction medium.

22. A process according to claim 11, in which the organosilicon polymer comprises vinyl groups which are subsequently cross-linked by the addition of a free radical donating agent.

23. A process according to claim 11, in which the polysilicate mineral is a sheet silicate.

24. A process according to claim 11, in which the polysilicate mineral is a framework silicate.

* * * * *